Figure 3:
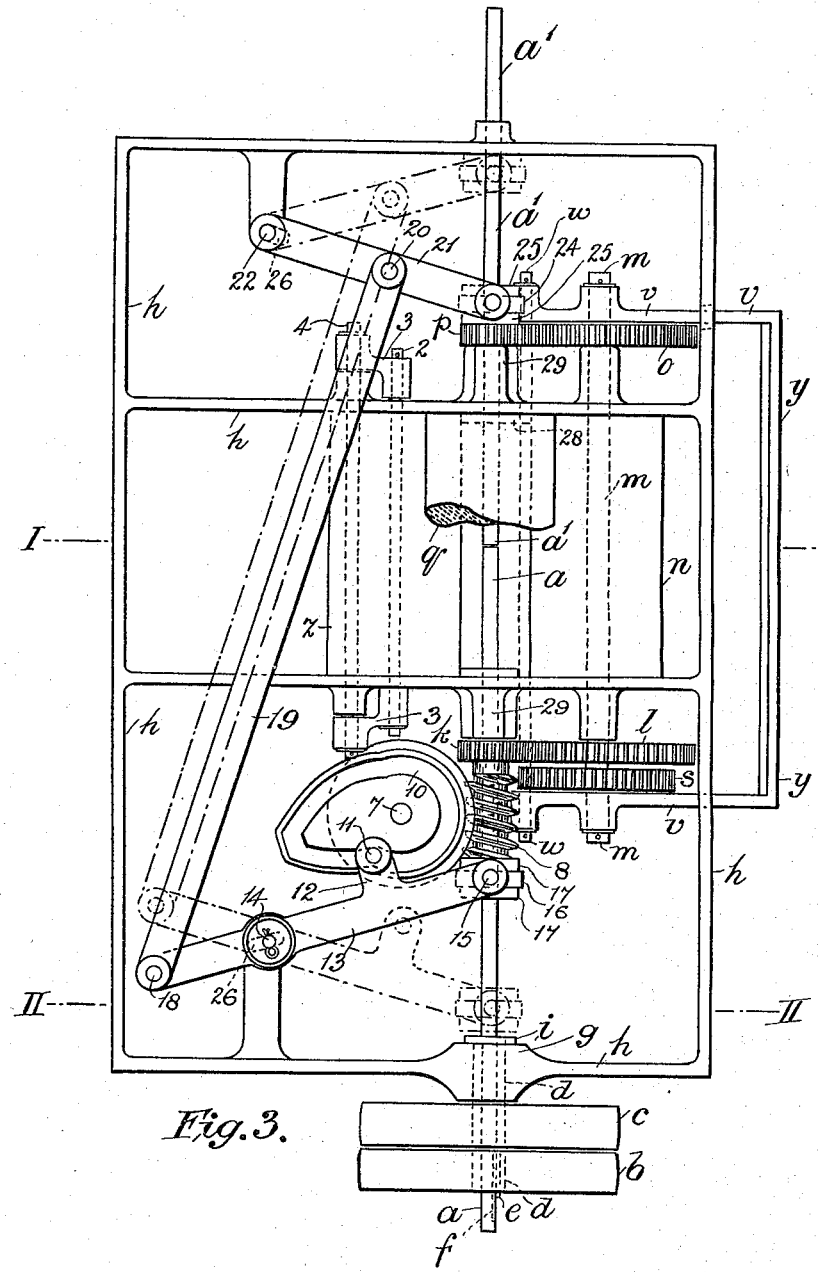

L. EMBREY.
APPARATUS FOR TREATING DOUGH AND LIKE PLASTIC MATERIAL.
APPLICATION FILED FEB. 19, 1914.
1,147,491.
Patented July 20, 1915.
2 SHEETS—SHEET 1.
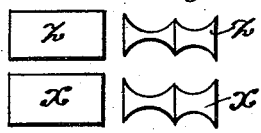
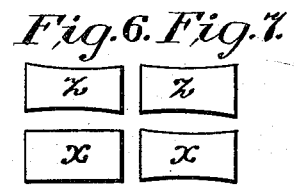
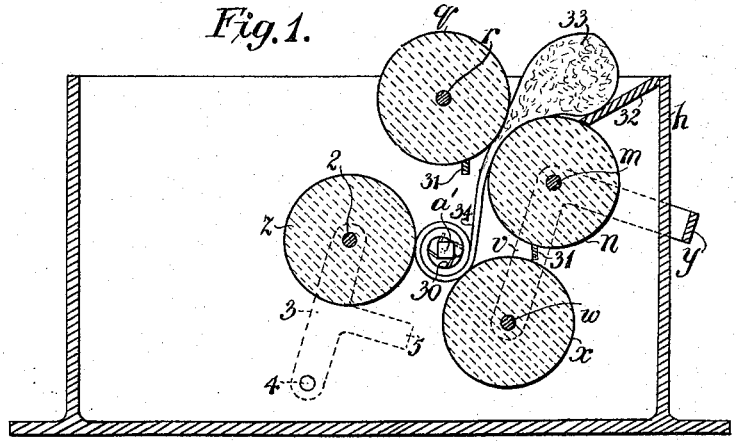
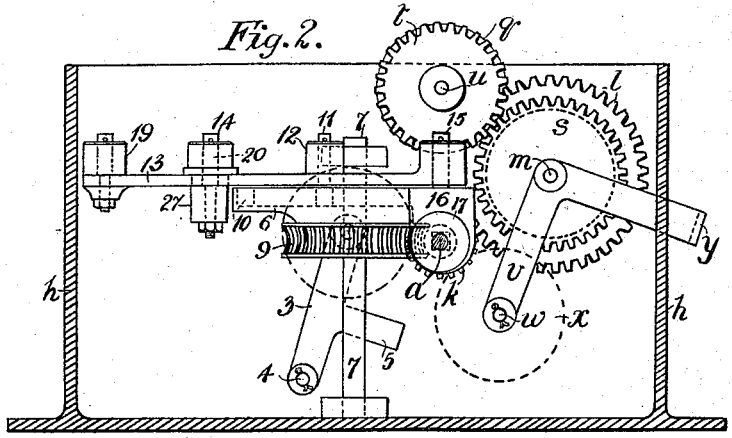
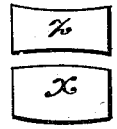
Witnesses.
Floyd R. Cornwall.
F. M. Meyer.
Inventor
L. Embrey.
By ~~~~~ Atty.

UNITED STATES PATENT OFFICE.

LAURENCE EMBREY, OF COUNTY OF STAFFORD, ENGLAND.

APPARATUS FOR TREATING DOUGH AND LIKE PLASTIC MATERIAL.

1,147,491.   Specification of Letters Patent.   Patented July 20, 1915.

Application filed February 19, 1914. Serial No. 819,809.

*To all whom it may concern:*

Be it known that I, LAURENCE EMBREY, subject of the King of Great Britain, residing at Staffordshire, England, have invented certain new and useful Improvements in Apparatus for Treating Dough and like Plastic Material, of which the following is a specification.

This invention relates to apparatus for the treatment of dough in the process known in the bakery art as molding and is designed to carry out the process described in my co-pending application Serial No. 855,469 which has been divided from this present application.

The object of the present invention is to enable mechanical means to be employed for working the dough, so that not only are the above mentioned disadvantages avoided, but the gluten is stretched in a better and more uniform manner than can be usually done by hand, whereby a lighter bread is obtained and one which has a better bloom and will remain moist for a greater time than usual.

According to the present invention tension is applied to the dough or the like by mechanical means which include a moving member adapted to engage with the dough in the form of a strip, rope or the like, and to draw it forward, so that practically the whole of the gluten both within and on the outside of the strip or the like is subjected to a stretching action.

In the preferred form the moving member is adapted to rotate so that it spins or winds the dough and thereby applies tension thereto from within the mass.

Many different modes of applying the invention may be adopted and the details of the mechanism employed may be varied to suit the nature of the dough, size or shape of the loaves, or other special requirements as will be evident from the following description of devices illustrated by way of example only in the accompanying drawings, in which:

Figures 1 to 3 illustrate one form of machine for stretching and shaping dough in small pieces, such as used in the making of loaves, rolls or the like. Figs. 1 and 2 are sectional elevations on the lines I—I, II—II, Fig. 3 which is a plan, from which, however, some parts are omitted for sake of clearness. Figs. 4 to 8 illustrate suitable forms of guide or shaping rollers which may be used.

In carrying out the invention according to one mode for instance in the treating of dough in small pieces ready for making loaves, rolls or the like, a rotating spindle is adopted for the moving member which is to engage with and stretch the dough. This spindle in the example illustrated in Figs. 1 to 3 is conveniently made in two contiguous parts $a\ a'$. The part $a$ is rotated by a fast pulley $b$, which together with a loose pulley $c$ is carried by a sleeve $d$ on the end of the spindle $a$, the latter having a keyway $f$ in which slides a key $e$ fixed in the sleeve $d$ so that although the spindle $a$ may be reciprocated in the sleeve it is bound to rotate with the same. The sleeve $d$ is conveniently supported in a boss $g$ in the main frame $h$ and has a retaining collar $i$. The part $a'$ of the spindle is rotated at the same speed as the part $a$ through the medium of toothed wheels $k$, $l$, $o$ and $p$. The wheels $k$ and $p$ are provided with bores of square cross section so that they are caused to rotate with the respective parts $a\ a'$ of the spindle, which except in the case of the outer portion of the part $a$, are of square cross section. The toothed wheels $l$ and $o$ are mounted on the spindle $m$ of a roller $n$, the spindle being carried by the frame $h$. A toothed wheel $s$ also on the spindle $m$ meshes with a toothed wheel $t$ on the spindle $u$ of another roller $q$. Part of the roller $q$ and the wheel $t$ are omitted in Fig. 3 for sake of clearness. A pair of levers $v$ pivoted freely on the spindle $m$ and connected by a cross bar $y$ forming a counterweight, carry a spindle $w$ for a freely rotatable guide roller $x$. A similar freely rotatable guide roller $z$ is mounted on a spindle 2, carried by a pair of levers 3 pivoted at 4, 4, and provided with a counterweight, 5.

The two parts $a\ a'$ of the winding spindle are adapted to be periodically moved away from and toward each other by means of a cam 6, mounted on a spindle 7, rotated by a worm 8, through which the spindle $a$ can slide, the worm engaging with a worm wheel 9. A slot 10 in the cam receives a pin 11 carried by an extension 12 on a lever 13 having a fulcrum 14. One end of the lever 13 engages with a pin 15 carried by a plate 16 held between two collars 17, 17 secured to the part $a$ of the winding spindle. A link 19 is connected at 18 to the lever 13 and at 20 to a lever 21 pivoted at one end 22 and engaging at its other end with a pin 23 carried by a plate 24 held between two collars 25, 25, fixed on the part $a'$ of the spindle. The levers 13 and 21 are slotted at 26 adjacent to their fulcrum so that when the cam 6 rotates, the levers are free to move together outwardly and inwardly periodically to move the parts $a$ $a'$ of the winding spindle away from and toward each other.

The operation of the machine above described is as follows: A piece of dough 33 placed on a sloping table 32 is fed by the rollers $n$ $q$ in the form of a strip 34 which is either directly engaged by grippers 30 on the spindle $a$ $a'$ or is guided thereon by the roller $x$. The feeding rollers $n$ $q$ are preferably of unglazed porcelain, biscuit ware or like material to which the dough is not likely to adhere, but to avoid adherence of the strip, scrapers 31, 31 may be provided. When the winding spindle $a$ $a'$ engages with the strip it winds it up as indicated in Fig. 1, and thereby applies tension to the strip from within outward, that is to say, the whole of the gluten both within and on the outer layers of the dough is stretched. The freely rotatable rollers $x$ and $z$ are lightly pressed back by the dough against the action of their counterweights, so that they apply sufficient pressure to prevent any slackness or puckering of the dough or in other words, help to maintain the dough under tension. Any desired number of these tension rollers may be used. In order that they may be held out of contact with the bar when no dough is thereon, suitable stops are provided to limit their inward movement, the stops being conveniently in the form of friction wheels 28, 28 with which the rollers engage, the diameter of these wheels being approximately equal to that of the greatest diameter of the path described by the grippers 30 so that contact with the grippers is just avoided. The rollers $x$ $z$ may be of any desired shape or form in order that they may be used to shape the dough wound on the bar, for instance, any of the forms indicated in Figs. 4 to 8 may be adopted for them.

When the strip has been totally wound, the cam 6 and connected mechanism before described, withdraws the parts $a$ $a'$ so that the wound and stretched dough is released and may fall on to a table to be removed by hand, or on to a chute, conveyer or the like, the spindle parts $a$ $a'$ in the meantime being returned. If desired the rollers $x$ $z$ may be separated automatically, simultaneously with the withdrawal of the parts $a$ $a'$ of the spindle so that the dough falls clear of them.

By an apparatus such as above described tension is applied to the whole of the gluten in the dough, that is to say the tension is applied to the interior of the dough as well as the exterior.

After the dough has been stretched by the winding spindle, cone or other equivalent device it may be passed on to an endless conveyer, if it is required to move it to a distance, and this conveyer may be arranged below the cone or immediately alongside the same so that as the dough is partly wound on the winding device it passes off the same on to the conveyer. In this form the spindle 44 is indicated as being rotated by a chain 50 driving a sprocket pinion 51 on the spindle and being driven in turn by a sprocket pinion 52 on a shaft 53 carrying a worm wheel 54 driven by a worm shaft 55. If desired a variable speed gear can be used to vary the speed of the cone. For instance a friction disk 56 mounted on the worm shaft may be driven through the medium of a small wheel 62 adapted to be moved radially across the face of the disk 56 to vary the speed in the well known manner. The rope of dough 38 may be guided by a roller 57 on to the cone, the roller being carried by a lever 58 pivoted at 59 and provided with a counter weight 60. A guard roller 61 may prevent the dough winding on the spindle 44.

By winding dough in the manner described without or with the application of a light exterior pressure by means of movable rollers, a constant tension is maintained throughout the dough, in contradistinction to the effect produced by known devices in which a moving band is used with the intention of rolling a piece of dough on a stationary surface, in which case the stationary surface produces a lag on the dough, while the moving band applied to the opposite part or section thereof presses the same forward and causes buckling or puckering of the dough so that no tension is actually applied to the interior thereof and the resulting loaf when baked is defective.

I claim:—

1. Apparatus for stretching dough comprising means for forming a strip of dough and a movable member adapted to engage with said formed strip of dough and to wind same to apply tension to the dough strip from within the mass thereof.

2. Apparatus for stretching dough, comprising a rotary member adapted to engage with and wind said dough into a coil around and about said member and means for applying external pressure to said wound dough.

3. Apparatus for stretching dough comprising means for forming a strip of dough, a rotary member adapted to rotate and to wind said formed strip of dough into a coil about said rotary member and means for applying light external pressure to said strip while it is being wound on said member.

4. Apparatus for stretching dough and the like glutinous material, comprising a rotary member, means for feeding a strip of dough thereto to be wound thereon, and freely movable pressing means adapted to be pressed lightly into contact with the dough wound on said rotary member.

5. Apparatus for stretching dough and the like glutinous material, comprising a rotary member adapted to wind a strip of dough into a coil about said rotary member, a freely mounted roller, and automatic means for holding said roller lightly in contact with the dough on said spindle.

6. Apparatus for stretching dough and the like glutinous material, comprising a rotating spindle adapted to wind a strip of dough upon itself, a pair of pivoted levers, a freely rotatable roller carried by said levers, and means for holding said roller in contact with the dough on said rotating spindle.

7. Apparatus for stretching dough and the like glutinous material, comprising a rotating spindle, adapted to wind a strip of dough upon itself, a plurality of co-acting grooved rollers, and means for pressing said rollers into contact with the dough wound on the spindle substantially as and for the purpose hereinbefore set forth.

8. Apparatus for stretching dough and the like glutinous material, comprising a rotary member adapted to wind a strip of dough on itself and thereby to apply tension thereto from within the wound mass, and means for withdrawing the said rotary member from the dough wound thereon.

9. Apparatus for stretching dough and the like glutinous material, comprising a two-part rotary spindle adapted to wind a strip of dough upon itself and means for withdrawing the two parts of said spindle from the dough wound thereon.

10. Apparatus for stretching dough and the like glutinous material comprising means for producing a strip of dough from a mass thereof, a rotary member adapted to engage with said strip and to wind it upon itself, and automatic means for removing the dough from said rotary member.

11. Apparatus for stretching dough and the like glutinous material, comprising a rotary spindle, adapted to engage with and to wind a strip of dough on itself, a plurality of freely rotatable rollers, means for holding said rollers in contact with the dough wound on the said spindle, and means for automatically withdrawing the spindle from the wound dough consisting of a pivoted lever, having one end pivotally connected with the aforesaid spindle and a rotary cam adapted to oscillate said pivoted lever, substantially as hereinbefore set forth.

12. Apparatus for stretching dough and the like glutinous material, comprising a two-part rotary spindle having the two parts in alinement with each other, means for rotating said spindle for the purpose of winding a strip of dough thereon, freely rotatable rollers, means for holding said rollers in contact with the dough wound on the spindle, and means for withdrawing the spindle from the dough wound thereon, consisting of a pair of pivoted levers each pivotally connected to one of the parts of the aforesaid rotary spindle, a link connecting said levers, and a cam adapted to oscillate one of the levers substantially as and for the purpose hereinbefore set forth.

13. Apparatus for stretching dough and the like glutinous material, comprising a two-part rotary spindle having the two parts in alinement with each other, means for rotating said spindle for the purpose of winding a strip of dough thereon, freely rotatable rollers, means for holding said rollers in contact with the dough wound on the spindle, and means for withdrawing the spindle from the dough wound thereon, consisting of a pair of pivoted levers each pivotally connected to one of the parts of the aforesaid rotary spindle, a link connecting said levers, and a cam adapted to oscillate one of the levers, means for rotating one part of the said spindle, a worm on said part of said spindle, a worm wheel in engagement with the worm and connected with the cam so as to rotate therewith, and means for transmitting the rotary motion of the said rotated part of the spindle to the other part thereof, substantially as hereinbefore described.

In testimony whereof I have signed my name to this specification in the presence of two subscribing witnesses.

LAURENCE EMBREY.

Witnesses:
   VINCENT FLACKER,
   FRANK NADSLEY.